(12) United States Patent
Nakai et al.

(10) Patent No.: US 7,155,413 B2
(45) Date of Patent: Dec. 26, 2006

(54) ELECTRONIC APPARATUS AND MANAGEMENT SYSTEM OF THE SAME

(75) Inventors: Yasuhiro Nakai, Soraku-gun (JP);
Kimihito Yamasaki, Tenri (JP);
Fujikazu Nakayama, Ikoma (JP);
Masakatsu Nakamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 09/833,038

(22) Filed: Apr. 12, 2001

(65) Prior Publication Data

US 2001/0034713 A1 Oct. 25, 2001

(30) Foreign Application Priority Data

Apr. 21, 2000 (JP) ............................. 2000-121667

(51) Int. Cl.
*G06Q 99/00* (2006.01)
*H04K 1/00* (2006.01)
*H04L 9/00* (2006.01)

(52) U.S. Cl. ............................. 705/51; 705/57; 707/1; 707/3; 707/4; 707/10; 707/102; 707/200; 709/201; 709/223; 709/224

(58) Field of Classification Search ................. 705/50, 705/51, 57; 707/1, 3, 4, 10, 102, 200; 709/221, 709/223, 224
See application file for complete search history.

(56) References Cited

U.S. PATENT DOCUMENTS

| | | | | |
|---|---|---|---|---|
| 5,910,987 A | * | 6/1999 | Ginter et al. | 705/52 |
| 5,968,175 A | * | 10/1999 | Morishita et al. | 713/200 |
| 6,330,549 B1 | * | 12/2001 | Merkle | 705/51 |

FOREIGN PATENT DOCUMENTS

| | | | |
|---|---|---|---|
| JP | 7-18244 A | | 7/1995 |
| JP | 07-219761 | | 8/1995 |
| JP | 09154001 | * | 11/1995 |
| JP | 09-154001 | | 6/1997 |
| JP | 11-045034 | | 2/1999 |
| JP | 11-161111 | | 6/1999 |
| JP | 11-194936 A | | 7/1999 |

(Continued)

OTHER PUBLICATIONS

Perrit, Henry H. Knowbots, Permission Headers, and Contract Law. Apr. 1993.*

(Continued)

*Primary Examiner*—James A Reagan
(74) *Attorney, Agent, or Firm*—Nixon & Vanderhye P.C.

(57) ABSTRACT

An image processing device stores a main program that controls basic operations that the device conducts as a copying machine, a printer, a facsimile machine, etc., as well as a sub program that controls additional operations that the device conducts as a net work scanner. When a user purchases an additional function pack and sends a production number of the image processing device and ID information of the pack to a managing device, the managing device returns a releasing key produced by encoding the production number. A control section of the device decodes the releasing key, and permits the foregoing access if the production number obtained by the decoding matches that stored in the memory section. Therefore, even after shipment, extension of functions can be smoothly implemented at lower costs without replacement of boards or memories. Thus, an image processing device realized with a digital complex machine is arranged so that extension of functions after shipment can be smoothly implemented at lower costs.

25 Claims, 11 Drawing Sheets

FOREIGN PATENT DOCUMENTS

| | | |
|---|---|---|
| JP | 11-212783 A | 8/1999 |
| JP | 11-220564 | 8/1999 |
| JP | 2000-056965 | 2/2000 |
| JP | 2001-103270 | 4/2001 |

OTHER PUBLICATIONS

Japanese Office Action mailed Jun. 1, 2004 (w/English translation thereof).

* cited by examiner

F I G. 4
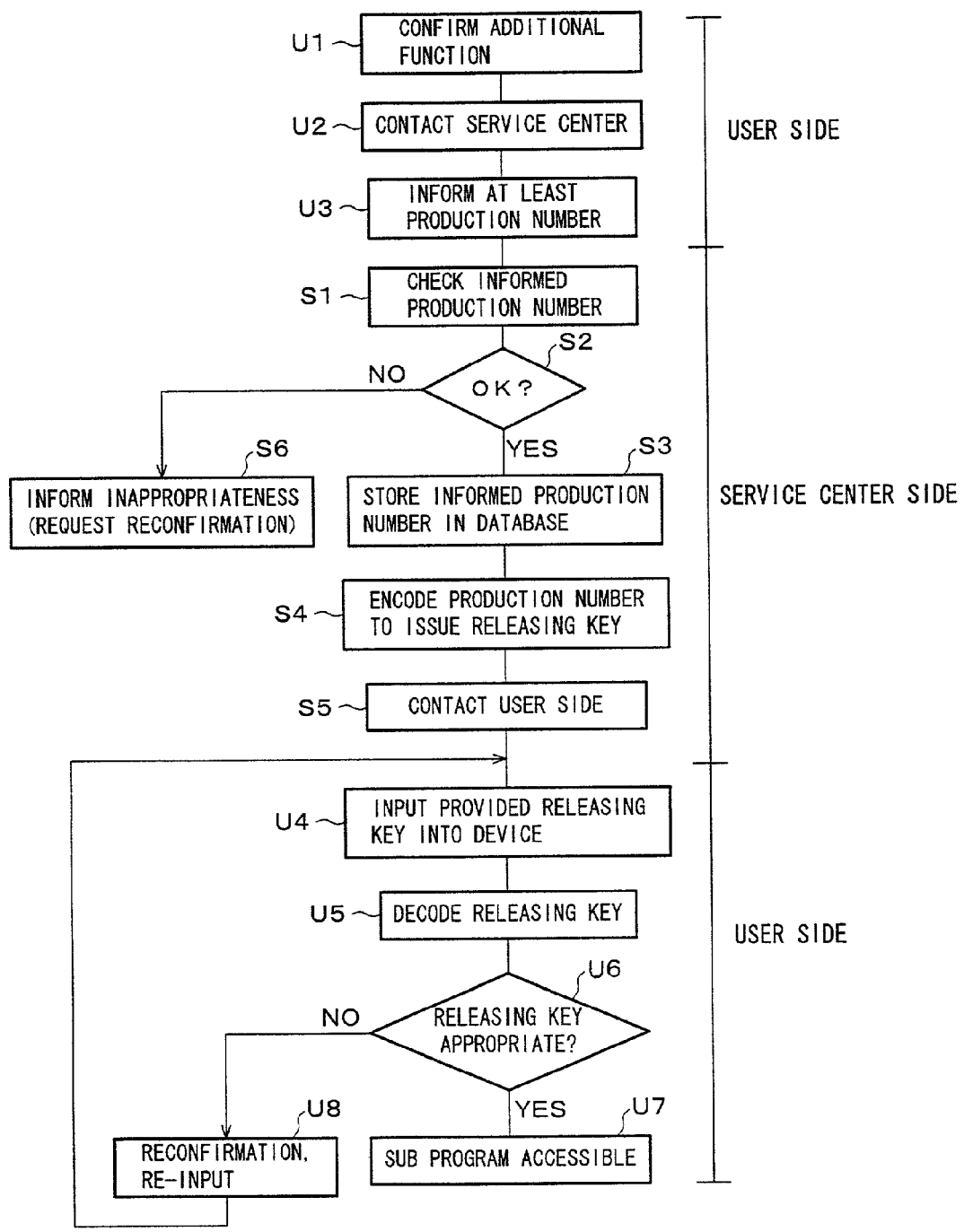

FIG. 5

| PRODUCTION NUMBER | EXTENSION FUNCTION: TYPE 1 | DATE OF EXTENSION | RELEASING KEY | EXTENSION FUNCTION: TYPE 2 | DATE OF EXTENSION | RELEASING KEY |
|---|---|---|---|---|---|---|
| 901XXX | AXXX00 | 99.11.10 | XXXX | BXX000 | 99.11.10 | XXXX |
| 901XXX | AXXXX0 | 99.11.25 | XXXX | — | — | — |
| 910XXX | AXX000 | 99.11.15 | XXXX | — | — | — |
| 911XXX | BXXX00 | 99.12.1 | XXXX | — | — | — |
| 912XXX | AXXXXX | 99.12.20 | XXXX | BXX000 | 99.12.20 | XXXX |
| 914XXX | BXXXX0 | 99.11.28 | XXXX | — | — | — |

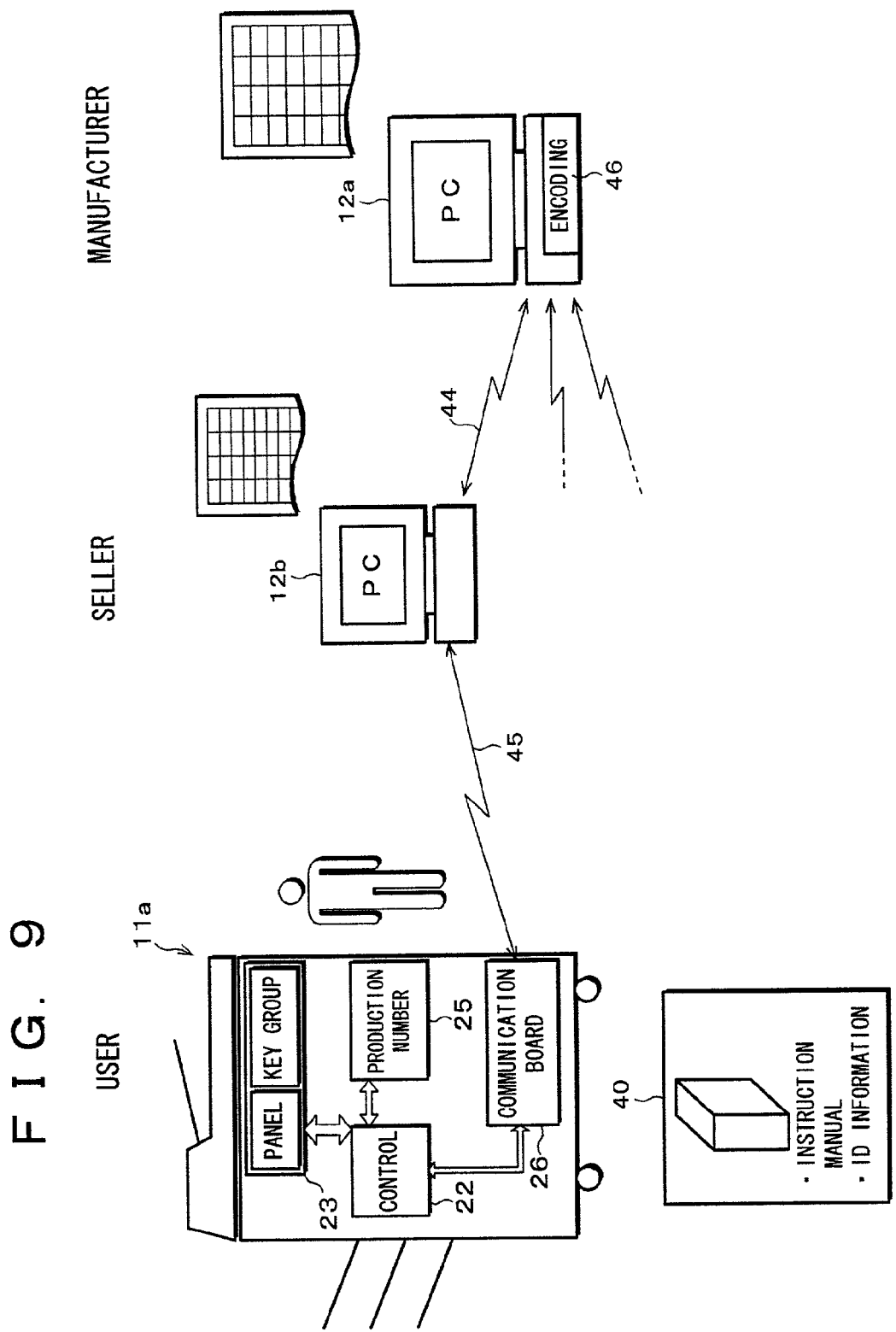

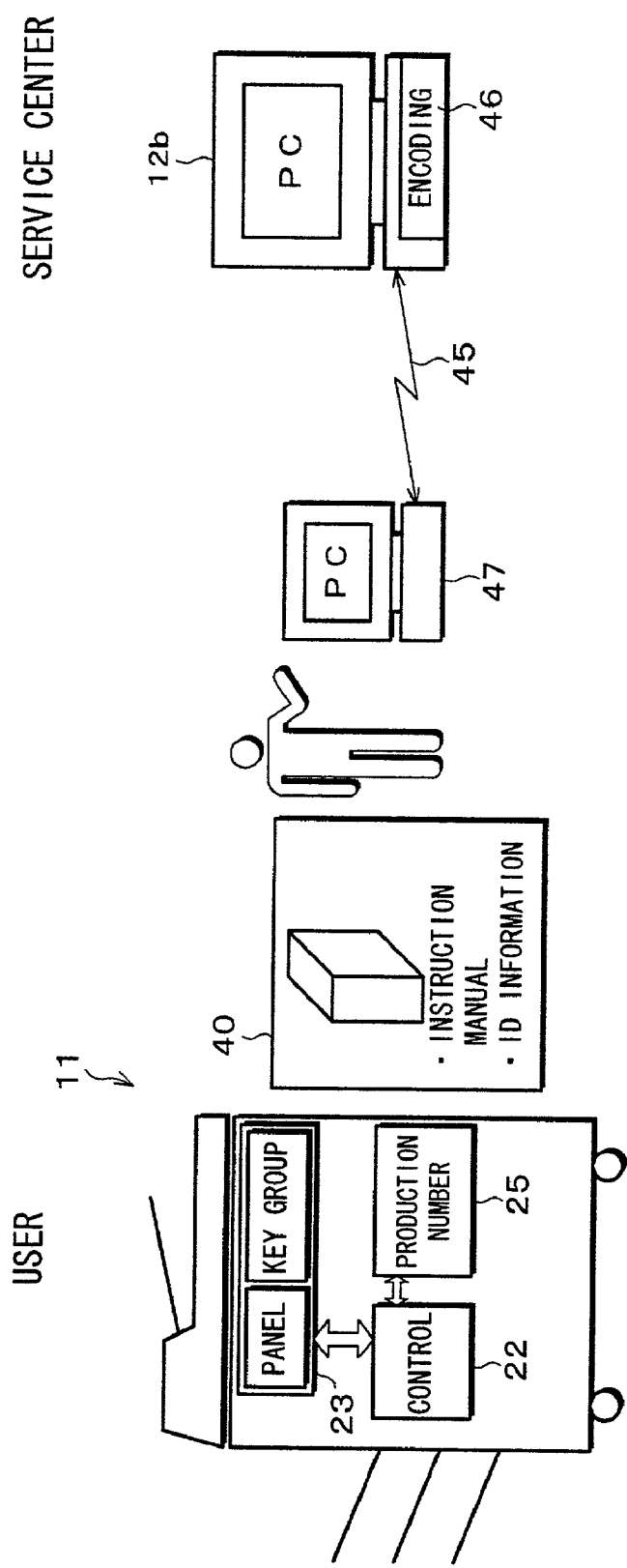

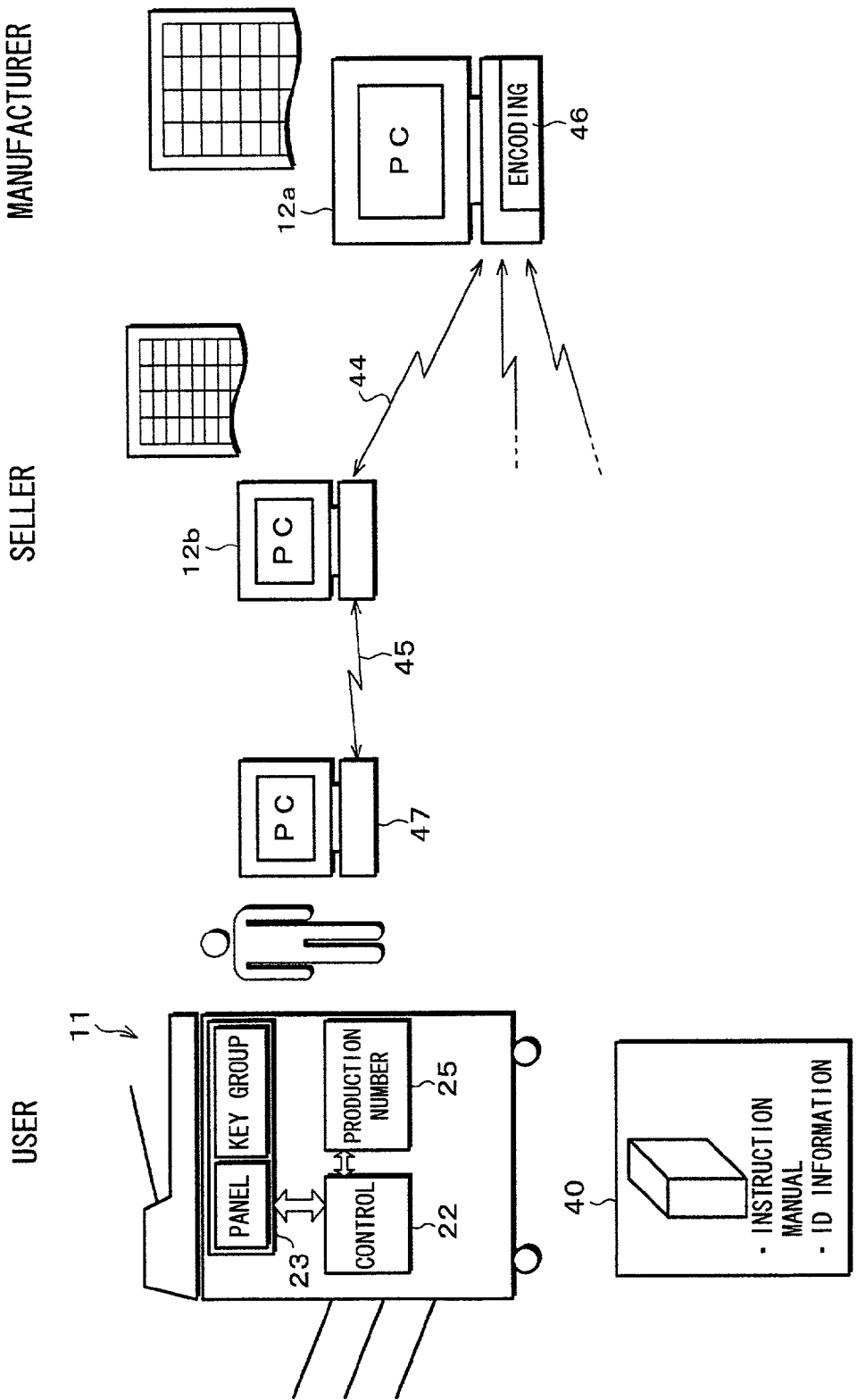

ELECTRONIC APPARATUS AND MANAGEMENT SYSTEM OF THE SAME

FIELD OF THE INVENTION

The present invention relates to an electronic apparatus such as an image processing device, and particularly relates to (i) an electronic apparatus arranged so that extension of its functions is permitted, such as a digital complex machine connected with a network so as to function as a facsimile machine and as a printer, and (ii) a system for managing the electronic apparatus.

BACKGROUND OF THE INVENTION

Among image processing apparatuses, small-size copying machines, for instance, are sold at volume sales shops and retail shops and are arranged so that expendables such as paper and toner for use therewith are also available at these shops, service centers of manufacturers thereof, etc. On the other hand, copying machines for business use are to be managed by manufacturers and retail shops, and replenishment of expendables and maintenance of the machines are also carried out by service companies and retail shops affiliated with the manufacturers. Extension of functions after shipment of the apparatuses to the market is also carried out by the foregoing service companies, retail shops, etc. in response to changes in an environment on the user side, the user's request for new functions, etc., for instance, addition of a recirculating automatic document feeder or a device for processing discharged copied sheets.

In the case where, apart from such addition of devices as described above, addition, rewriting, or replacement of programs is needed upon such extension of functions, conventionally, one engaged in checking and maintenance (service man) meets such needs by rewriting system programs managed in memories or hard disks into new system programs through installing operations, or by replacing system-program-managing memories or hard disks with another memories or hard disks in which new system programs are managed.

In the aforementioned prior art, in the case where the extension of functions is achieved by installing operations as described above, there arise problems that the operations are complicated, and that the operations have to be done by those who have expertise in the technologies and have sufficient knowledge about the arrangement of the apparatuses.

On the other hand, in the case where the extension of functions is achieved by replacement of parts such as boards or memories, there arises a problem that the aforementioned expertise is required to carry out the replacing operations. Further, the manufacturers are required to prepare, in addition to the original basic program, a variety of boards and memories in which one or a plurality of additional programs are installed in combination, which causes the costs of parts to rise, as well as makes it necessary to carry out a verifying operation for each combination of programs, while on the user side, extension of function necessarily makes some parts to be no longer used. Furthermore, there also arise problems that illegal copied boards and memories are used thereby hindering the manufacturers from obtaining proper benefits, and that such boards and memories cause troubles.

As described above, conventionally, since such shift to a new system resulting from extension of functions takes costs and time, it is impossible to immediately respond to changes in the environments in which the apparatuses are used, or to meed demands for addition of new functions.

SUMMARY OF THE INVENTION

An object of the present invention is to provide an electronic apparatus (for instance, an image processing device) arranged so that extension of functions after shipment (after purchase of the same by a user) can be smoothly implemented at lower costs, and a management system of the same.

To achieve the foregoing object, an electronic apparatus of the present invention includes (i) a program storing section for storing a first program for controlling basic operations of the electronic apparatus, and a second program that is accessed in the first program so as to control an additional operation of the electronic apparatus, (ii) a control section for implementing a desired operation by executing only the first program, or both the first and second programs, and (iii) a system managing section that, in response to a releasing key operation that renders the additional operation implementable, makes the second program accessible in the first program.

In a normal state of the foregoing apparatus after shipment to the market, the system managing section inhibits access to the second program, and the foregoing electronic apparatus operates according to the first program. When the releasing key is issued upon the user entering into a use contract with the manufacturer or the seller or paying a use fee thereto, the second program is made accessible by a releasing key operation using the releasing key, whereby the second program becomes implementable.

Therefore, it is possible to carry out expansion of function according to the user's purpose of use or an environment of use. Moreover, the expansion of functions in this manner does not need replacement of boards or memories. Therefore, the manufacturer does not have to prepare a variety of boards or memories in which one or a plurality of the second programs are combined with the first program, while on the user side extension of functions does not result in making any part unnecessary. Therefore, the arrangement that allows extension of functions after shipment requires only a slightly larger memory capacity to be installed in the electronic apparatus, but results in reduction of costs for parts regarding the apparatus as a whole. Furthermore, illegal use of copied boards and memories can be eliminated.

Furthermore, since only one program is stored in the program storing section and only inhibition of access to a part thereof is carried out, defects such as bugs decreases as compared with the case of later addition by replacement or installation, and sequence of the entirety possibly becomes smoother. Therefore, an operation checking work and the like can be simplified, while the reliability can be improved. Furthermore, the extension of function can be implemented, not by complicated works such as replacement of boards or installation that require expertise, but by simple setting operations that a service man or a user can carry out.

Thus, extension of functions after shipment can be smoothly carried out at lower costs.

Furthermore, to achieve the aforementioned object, an electronic apparatus of the present invention includes (i) a program storing section for storing a first program for controlling basic operations of the electronic apparatus, and a second program that cooperates with at least a part of the first program so as to implement an additional operation of the electronic apparatus, and (ii) a system managing section that, in response to a releasing key operation that renders the additional operation implementable, makes the second program accessible.

In a normal state of the foregoing apparatus after shipment to the market, the system managing section inhibits access to the second program, and only basic operations according to the first program are implemented. When the releasing key is issued upon the user entering into a use contract with the manufacturer or the seller or paying a use fee thereto, the second program is made accessible by a releasing key operation using the releasing key, whereby additional operations can be implemented by cooperative operations of the first and second programs.

Thus, in this case as well, extension of functions after shipment can be smoothly carried out at lower costs.

Furthermore, to achieve the aforementioned object, a management system for managing an electronic apparatus that includes:

a program storing section for storing a first program for controlling basic operations of the electronic apparatus, and a second program that is accessible in the first program and controls an additional operation of the electronic apparatus;

a control section for implementing a desired operation by executing only the first program, or both the first and second programs; and a system managing section that, in response to a releasing key operation, makes the second program accessible by the first program, the management system is characterized by including a key issuing section on a managing side that issues the releasing key upon confirming that a predetermined procedure has been conducted by a user side.

With the foregoing management system for managing an electronic apparatus, extension of functions can be carried out without replacement of any parts after shipment of the apparatus to the market, while the service center side has an advantage that extension of functions in such a manner does not cause any additional costs on the service center side while produces profits even after sales of the device, in addition to profits from sales of expendables.

Furthermore, to achieve the aforementioned object, a management system of the present invention for managing an electronic apparatus that includes:

a program storing section for storing a first program for controlling basic operations of the electronic apparatus, and a second program that cooperates with at least a part of the first program so as to implement an additional operation of the electronic apparatus; and a system managing section that, in response to a releasing key operation, makes the second program accessible, the management system is arranged so as to include a key issuing section on a managing side that issues the releasing key upon confirming that a predetermined procedure has been conducted by a user side.

With the foregoing managing system for managing an electronic apparatus as well, extension of functions can be carried out without replacement of any parts after shipment of the apparatus to the market, while the service center side has an advantage that extension of functions in such a manner does not cause any additional costs on the service center side while produces profits even after sales of the device, in addition to profits from sales of expendables. For a fuller understanding of the nature and advantages of the invention, reference should be made to the ensuing detailed description taken in conjunction with the accompanying drawings.

BRIEF DESCRIPTION OF THE DRAWINGS

FIG. 4 is a flowchart explaining a releasing key operation in detail.

FIG. 5 is a view illustrating an example of a history information management table.

FIG. 9 is a view explaining another example of a management system in accordance with the second embodiment.

FIG. 10 is a view explaining a management system of an image processing device in accordance with a third embodiment of the present invention.

FIG. 11 is a view explaining another example of the management system in accordance with the third embodiment.

DESCRIPTION OF THE PREFERRED EMBODIMENTS

Figure 1:
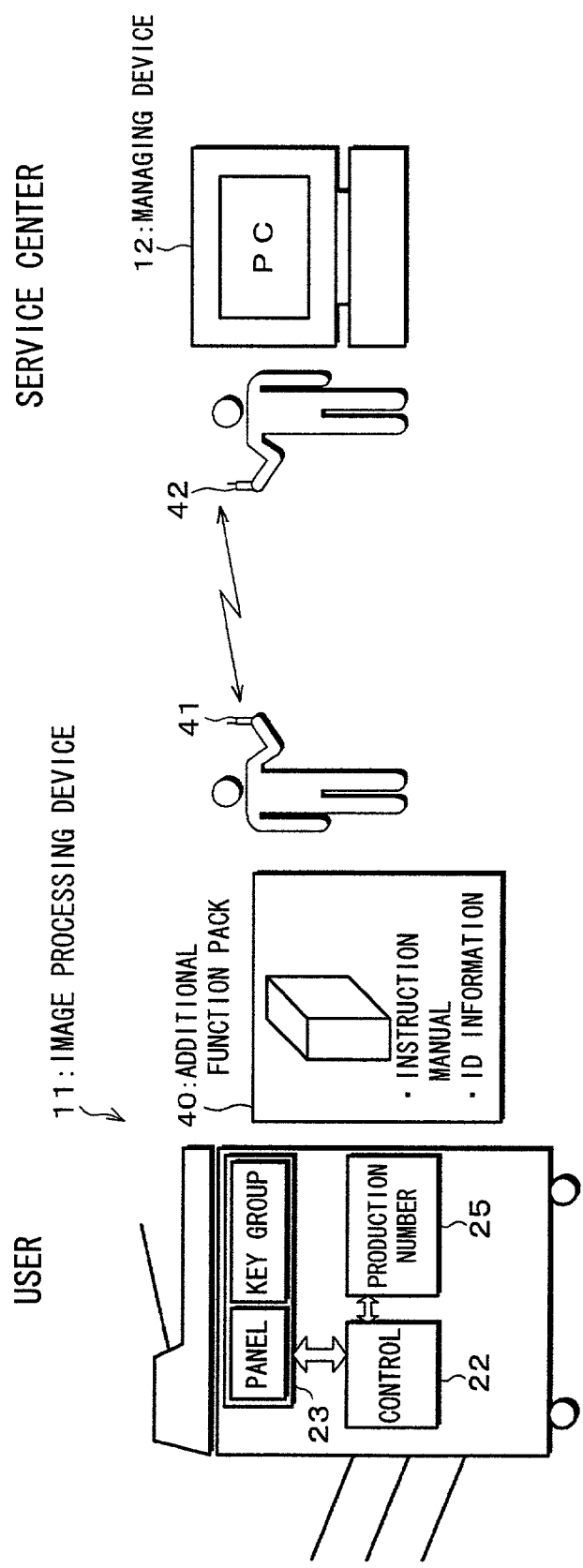
FIG. 1 is a view explaining a management system of an image processing device in accordance with a first embodiment of the present invention.

The following description will depict a first embodiment of the present invention while referring to the drawings.

FIG. 1 is a view explaining a management system of an image processing device in accordance with the first embodiment of the present invention. This system is roughly composed of an image processing device 11 that is a digital complex machine or the like, and a managing device 12 that is a computer provided in a service center affiliated with a manufacturer, or the like. The digital complex machine is a machine that has functions of a copying machine, a printer, and a facsimile machine all. The image processing device 11 is installed by a manufacture or a seller of the same, and is arranged so that the foregoing service center should implement replenishment of expendables to the same and maintenance of the same, as well as extension of the device itself, such as addition thereto of a recirculating automatic document feeder, a device for processing discharged copied sheets, etc.

The foregoing image processing device 11 is provided with an operation panel 23 including, for instance, a key group for input of instructions from the user, a display panel for display of various information such as a processing state to the user, and the like. The image processing device 11 further includes a control section 22 for controlling all of operations in the image processing device 11. The control section 22 is given a production number that is recorded in a non-volatile memory section 25, and a part of software is made implementable by utilizing the production number, as will be described later.

At the service center, the managing device 12 is to be used for managing data of the image processing device 11 that has been sold. For instance, it has a function to manage each of production numbers as described above that are information respectively peculiar to image processing devices 11, as well as a function to process each production number with use of a predetermined function so as to encode the same, as will be described later.

Figure 2:
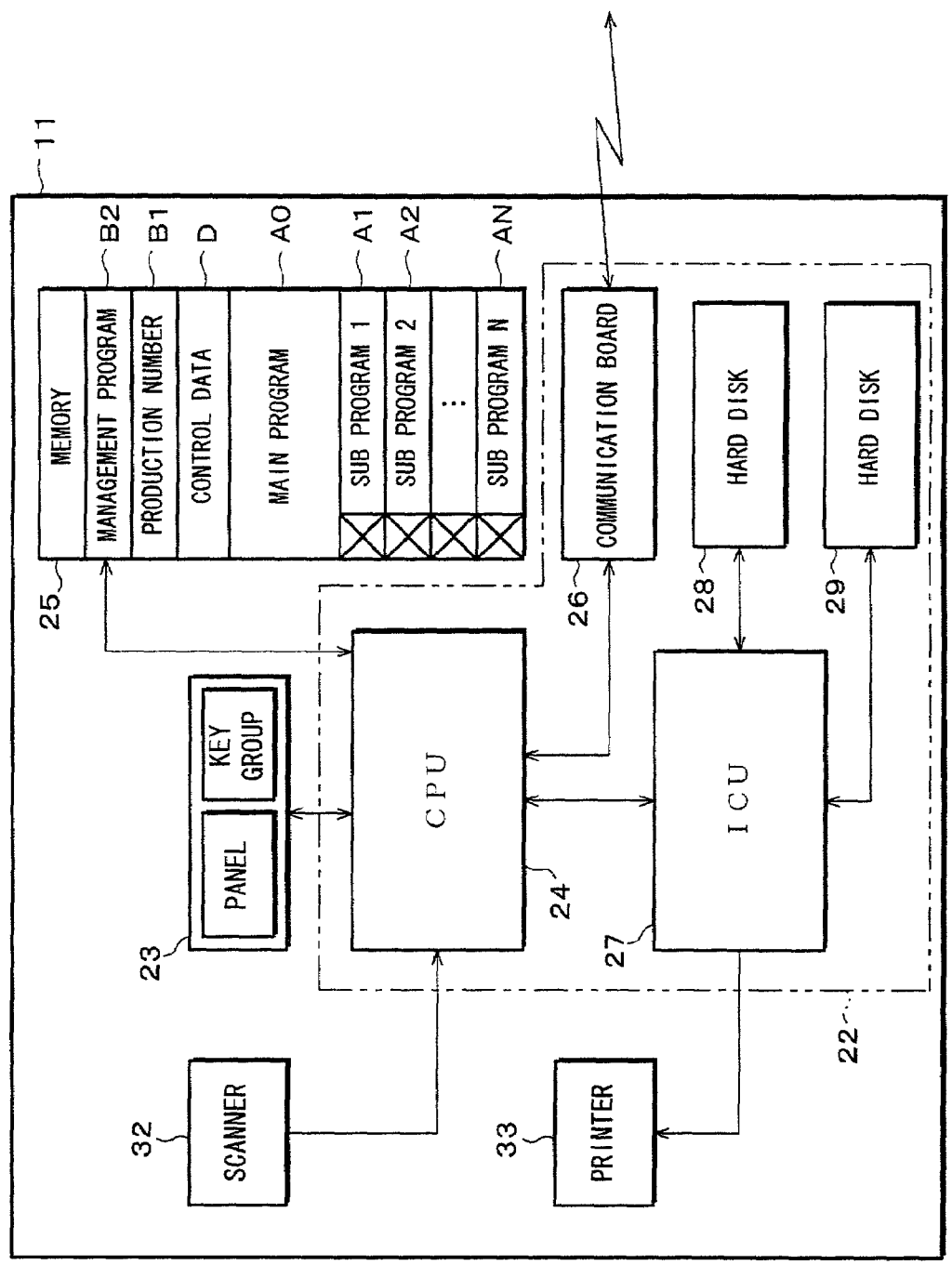
FIG. 2 is a block diagram illustrating an arrangement of control sections and control target sections associated with the control sections in the foregoing image processing device shown in FIG. 1.

FIG. 2 is a block diagram illustrating an arrangement of the control section 22 and a control target section associated with the control section 22 in the foregoing image processing device 11. As shown in FIG. 2, a CPU (central processing unit) 24 includes, in addition to the operation panel 23, the memory section 25 that stores information such as various data and programs, a communication board 26, an ICU (image control unit) 27, a scanner 32, etc. Furthermore, the foregoing ICU 27 is connected with hard disks (HD) 28 and 29 as memory devices capable of managing data, even those relatively large in size, a printer 33 for outputting image information by printing, etc.

The foregoing CPU 24 controls each part in accordance with instructions inputted by the user through the foregoing operations panel 23, so as to cause the same to execute image processing, communication, etc. For instance, the CPU 24 causes the scanner 32 to read a certain desired original document image, and to cause a part of the memory section 25, a part of the hard disks 28 and 29, etc. to temporarily store the read document image as image information in the page-unit form. The image information thus temporarily stored in the page-unit form can be outputted through the printer 33 or transmitted to an external apparatus designated as a destination of transmission via the communication board 26. Furthermore, the CPU 24 is capable of communication processing in a communication network such as Internet or Intranet, by controlling the communication board 26 in accordance with instructions of the user.

The foregoing ICU 27 is an image processing unit that performs predetermined image processing operations such as shading correction, variable magnification, density correction, etc, with respect to image information inputted from the scanner 32, as one original document image. The image information having been subjected to various image processing operations is transferred to the printer 33, where the image information is processed so that it is reproduced as an image. The aforementioned communication board 26 is a communication interface for use in communication of the device as a digital complex machine with an external apparatus.

In the memory section 25, there are formed a memory region D for various kinds of data relating to control of the whole image processing device 11, memory regions A0, A1, ... AN for various kinds of control programs, a memory region B1 for the production number of the image processing device 11, and a memory region B2 for a management program for managing retrieval of the control programs, and so on. Incidentally, information such as various kinds of data may be stored in the hard disks 28 and 29.

Figure 3:
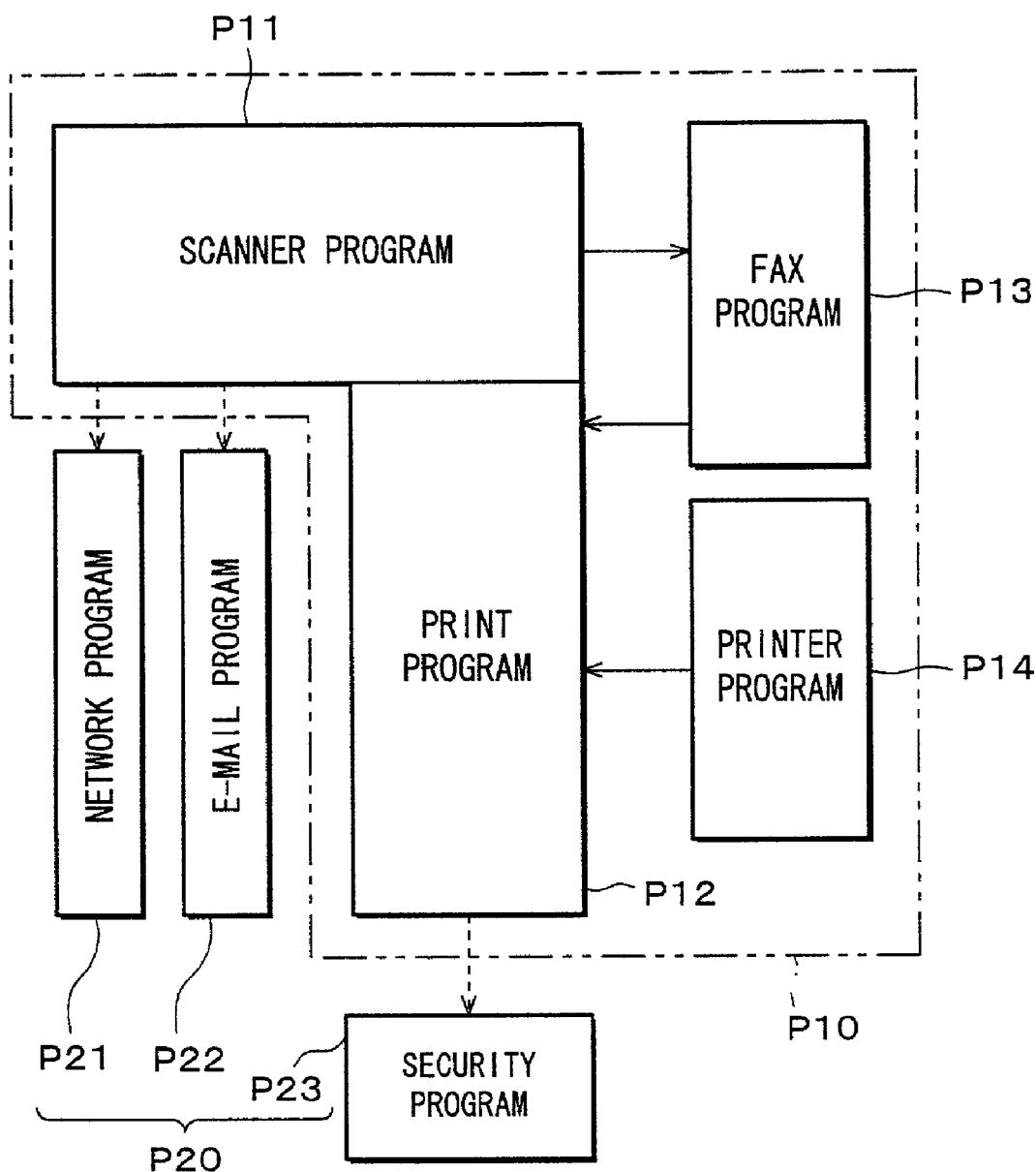
FIG. 3 is a diagram explaining an arrangement of a control program.

FIG. 3 is a view for explaining an arrangement of the control program. The control program is composed of a main program P10 as a first program for execution of basic actions, and a sub program P20 as a second program for execution of additional operations. The sub program P20 composed of sub routines is accessible from the main program P10. The sub program P20 and the main program P10 constitute one program.

The main program P10 is a program for controlling the complex machine functioning as the copying machine, printer, and facsimile machine. In other words, the main program P10 is composed of (i) a scanner program P11 applied during a copying operation and a facsimile sending operation, (ii) a print program P12 applied during a copying operation, a facsimile receiving operation, and a printing operation, (iii) a facsimile program P13 applied during a facsimile sending/receiving operation, and (iv) a printer program P14 applied during a printing operation.

The sub program P20 can take two formats: sub programs P21 and P22 take one format of realizing additional operations by cooperating with a part of the main program P10; and a sub program P23 takes another of realizing additional operations by being accessed by the main program P10.

Examples of the sub programs that realize additional operations by cooperation with a part of the main program P10 include a network program P21 that, for instance, makes the image processing device 11 sharable as a scanner by a plurality of personal computers in which image data read by the scanner 32 is transmitted as file information to a specific transmission destination via a communication network in cooperation with the scanner program P11. Further, an electronic mail (E-mail) program P22 for sending the read image by attaching a file of the same to an E-mail is also one example of the same.

On the other hand, examples of the sub program that realizes additional operations by being accessed by the main program P10 include a security program P23 that is accessed by the print program P12 and deletes, at a predetermined timing, image information on the hard disk devices 28 and 29 that the device 11 as the digital complex machine has handled in a printing operation.

The network program P21 and the E-mail program P22 as described above are unnecessary for the user who does not have the foregoing image processing device 11 connected with a personal computer network, and they are managed so that normally (upon shipment) the main program P10 is read out while the sub programs P20 should not be accessed. Further, the sub programs P20 are programs for network-connection sequence or the like, and in the memory section 25, the memory regions A1 through AN dedicated to the sub program P20 are very small as compared with the memory region D of the data or the memory region A0 dedicated to the main program P10. Therefore, the sub program 20 does not cause a drastic rise in the costs of the memory section 25 that is realized with memories or the like.

An embodiment of a function-extending operation that enables access to the sub program P20 in the image processing device 11 thus arranged and a management system of the same will be explained below, with reference to FIG. 1. Incidentally, the system explained below is described by taking a digital complex machine as an example, but it is applicable to, for instance, an electronic medical appliance that operates in accordance with a predetermined control program and is managed by a service center.

Here, functions that are available by extension of function by means of the sub programs P20 for enhancement of the system in terms of performance and function are previously informed to the users by means of an instruction manual of the image processing device 11, an operation guidance screen shown in the display section of the operation panel 23, a sales brochure, etc. so that the users can confirm the contents of such functions. The user who has confirmed the information and found that a function he/she needs is available may contact the service center to inform his/her need for extension of functions, and enter into a use contract or pay a use fee so that a releasing key should be issued by the managing device 12 and be set in the image processing device 11, whereby the function needed becomes implementable.

FIG. 4 is a flowchart illustrating the foregoing operation in detail. As described above with reference to FIG. 2, the memory section 25 stores the main program P10 for performing basic operations of the image processing device 11, and the plurality of sub program P20 for performing a variety of additional operations. Normally, the CPU 24 is set by the management program in the memory region B2 so that it operates according to only the main program P10, at a stage of shipment from the manufacturer (at a stage of shipment from a factory).

Next, when a user confirms that an additional function that the user needs is available at a step U1, the user or a service man carrying out maintenance and checking of the image processing device 11 informs the service center of the production number via communication means such as a telephone 41 at steps U2 and U3. Incidentally, the production number is carved in a plate provided on a main body of the image processing device 11, and therefore the production number can be read from the plate, or alternatively since being managed in the memory region B1, it may be displayed on the display section of the operation panel 23 for confirmation.

Furthermore, as shown in FIG. 1, an additional function pack 40 including an instruction manual about an additional function may be sold as a package, and upon purchase of the package, ID information peculiar to the package can be confirmed, which may be informed along with the foregoing production number.

On the other hand, on the service center side to which the production number has been informed, an operator checks a state of registration to avoid, for instance, double registration from the production number and/or the ID information carried on a database of the managing device 12 that manages history information as shown in FIG. 5 at a step S1, and determines whether or not the state of use is appropriate at a step S2. The history information shown in the example of FIG. 5 indicates that a type-1 extension function is used by all the users, that the second extension function is used by two users. Besides, it also indicates that the user who uses both the two extension functions started using the type-1 and type-2 extension functions at the same time.

Here, when the state of use is judged to be appropriate, the production number and/or the ID information thus informed is stored on the database as new managed data at a step S3, and the releasing key is produced by decoding the production number by means of a predetermined function at a step S4. The operator informs the releasing key to the user via communication means such as the telephone 42 at a step S5. Here, it is possible to charge the user a fee for use of the additional function. Furthermore, it is possible to issue the releasing key after it is confirmed that the user has paid the additional function use fee to the service center.

On the other side, in the case where it is judged that the state of use is inappropriate due to double registration or the like as to the production number and/or the ID information at the step S2 of confirmation, the service center contacts the user of the image processing device 11 again for reconfirmation at a step S6. With this, it is possible to prevent illegal remodeling of the image processing device 11, illegal use of built-in programs for additional functions, etc.

In the image processing device 11 side, the user inputs the releasing key provided to the user via the operation panel 23 of the image processing device 11 at a step U4. Using this the CPU 24 decodes the encoded production number at a step U5 by using a reverse function according to the managing program stored in the memory region B2, and the decoded production number is collated with the production number stored in the memory region B1 at a step U6. In the case where it is authenticated, it is regarded that use of the sub program P20 (any one of the sub programs P21, P22, and P23 or all of the same) for additional functions is allowed, thereby causing the sub program P20 to shift to an access-inhibited state to an access-allowed state at a step U7, thus modifying the environment so that the sub program P20 should be allowed to operate in an operation of the main program P10.

On the other hand, in the case where the releasing key is not appropriate due to an error in the input operation or the like, a message that requests re-input of the key just for reconfirmation is displayed on the display section of the operation panel 23 at a step U8, and guidance is carried out.

Incidentally, the number of the sub program P20 for an additional function stored in a part of the memory section 25 is not limited to one (the sub programs 20 are three in number in the example shown in FIG. 3), and such sub programs P20 may be arranged so as to be stored in the memory regions A1 through AN as programs that implement different additional functions respectively. Then, the releasing key operation may be arranged so that only sub programs for additional functions the user needs are made selectively accessible. In such a case, even though only one production number is used, different functions and corresponding reverse functions may be utilized with respect to the production number, so that the sub programs for functions should be made accessible individually. In the case where a plurality of sub programs for additional functions are sold in combination, the releasing key operation may not be carried out individually for the plurality of sub programs but may be carried out only once to make a plurality of the sub programs for additional functions accessible, by employing different functions for different combinations, respectively.

As described above, according to the present invention, access to sub programs is inhibited by the managing program at the stage of shipment of a device to the market, and the device operates basically according to a main program. When a releasing key is issued in response to a user's entry into a use contract or payment of a use fee to a manufacturer or a seller, a releasing key operation using the releasing key makes the access permitted, thereby making the sub programs implementable. Thus, extension of functions is implemented after shipment, corresponding to the purpose of use by the user or changes in an environment where the device is used.

Moreover, upon the extension, replacement of boards or the memory section 25 need not be carried out. The manufacturer does not have to prepare a variety of boards and memory sections 25 in which the main program P10 and a plurality of sub programs P20 are combined, while on the user side extension of functions does not result in making any part unnecessary. Therefore, the arrangement that allows extension of functions after shipment requires only a slightly larger memory capacity to be installed in the image processing device 11, but results in reduction of costs for parts regarding the image processing device 11 as a whole. Furthermore, illegal use of copied boards and memories can be eliminated.

Furthermore, since only one program is stored in the memory section 25 and only inhibition of access to a part thereof is carried out, defects such as bugs decreases as compared with the case of later addition by replacement or installation, and sequence of the entirety possibly becomes smoother. Therefore, an operation checking work and the like can be simplified, while the reliability can be improved. Furthermore, the extension of function can be implemented, not by complicated works such as replacement of boards or installation that require expertise, but by simple setting operations that a service man or a user can carry out.

Thus, extension of functions after shipment can be smoothly carried out at lower costs. Furthermore, the service center side has an advantage that extension of functions in such a manner does not cause any additional costs on the service center side while produces profits even after sales of the device, in addition to profits from sales of expendables.

Furthermore, since a releasing key is produced by using at least a production number that is information peculiar to a device, the releasing key varies from one device to another. Therefore, even if the releasing key that a user obtains by entering into a use contract or paying a use fee is used with respect to a plurality of devices, access to sub programs remains inhibited in devices whose production numbers are different from that for the releasing key. In other words, illegal use of a releasing key can be inhibited, while management of the image processing device 11 after sales can be strictly carried out by the management side.

Incidentally, the ID information of the additional function pack 40 may be input through the operation panel 23, and if the control section 22 is capable of collation with the ID information decoded, the releasing key may be produced by encoding the ID information. Further, other information than the production number or the ID information may be used for this purpose, provided that it is peculiar information with which the image processing device 11, the additional function pack 40, or the like can be individually identified. Furthermore, the foregoing management program may be arranged so as to encode the production number of the device of itself by using the same function as that used on the service center side and to collate the encoded production number with a decoded key inputted. Furthermore, in the case where the releasing key operation is set so as to be carried out at regular intervals, the service center side can regularly charge a use fee at the intervals, or also can make it free of charge for the first certain period so as to promote prevalence of the additional function.

Furthermore, since the adding operation according to the sub program P20 already installed at the shipment stage is enabled by the releasing key operation, the additional function does not excessively operate but can be made to operate in an ideal state. Furthermore, since functions more than needed do not operate, the device can be arranged so as to be easy for the user to operate.

Furthermore, in the case where the device is arranged so that use fees have to be paid to use additional functions, the device can be offered in a basic model (standard model) at first whose price is low, and the level of the device can be raised (functions of the device can be increased) according to demands. Therefore, the user does not have to pay for unnecessary functions, while the manufacturer can produce a volume of devices of the same specification, thereby can lower costs.

Figure 6:
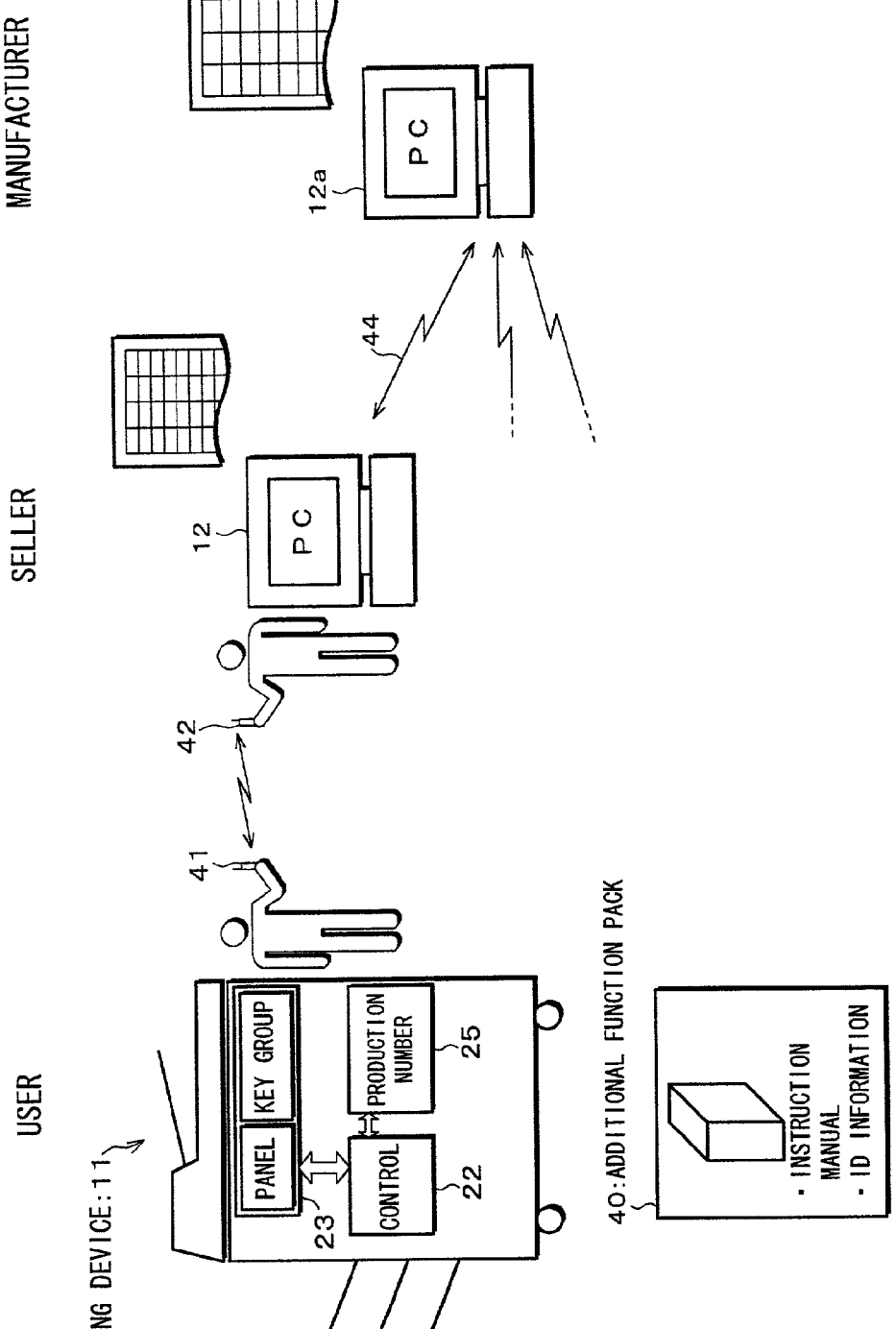
FIG. 6 is a view explaining another example of a management system in accordance with the first embodiment.

Furthermore, as shown in FIG. 6, by providing the managing device 12 at the seller, while providing another identical managing device 12a at the manufacturer, and connecting the same each other via a wide-area network 44 such as a telephone line or Internet, it is possible for the manufacturer side to manage history information as shown in FIG. 5, and issuance of a releasing key may be set so as to be carried out by a manufacturer to a seller. By so doing, the manufacturer become allowed to promptly grasp the state of use of additional functions, and to utilize the information for planning novel articles, for instance, for development of systems.

The following description will explain a second embodiment of the present invention while referring to the drawings.

Figure 7:
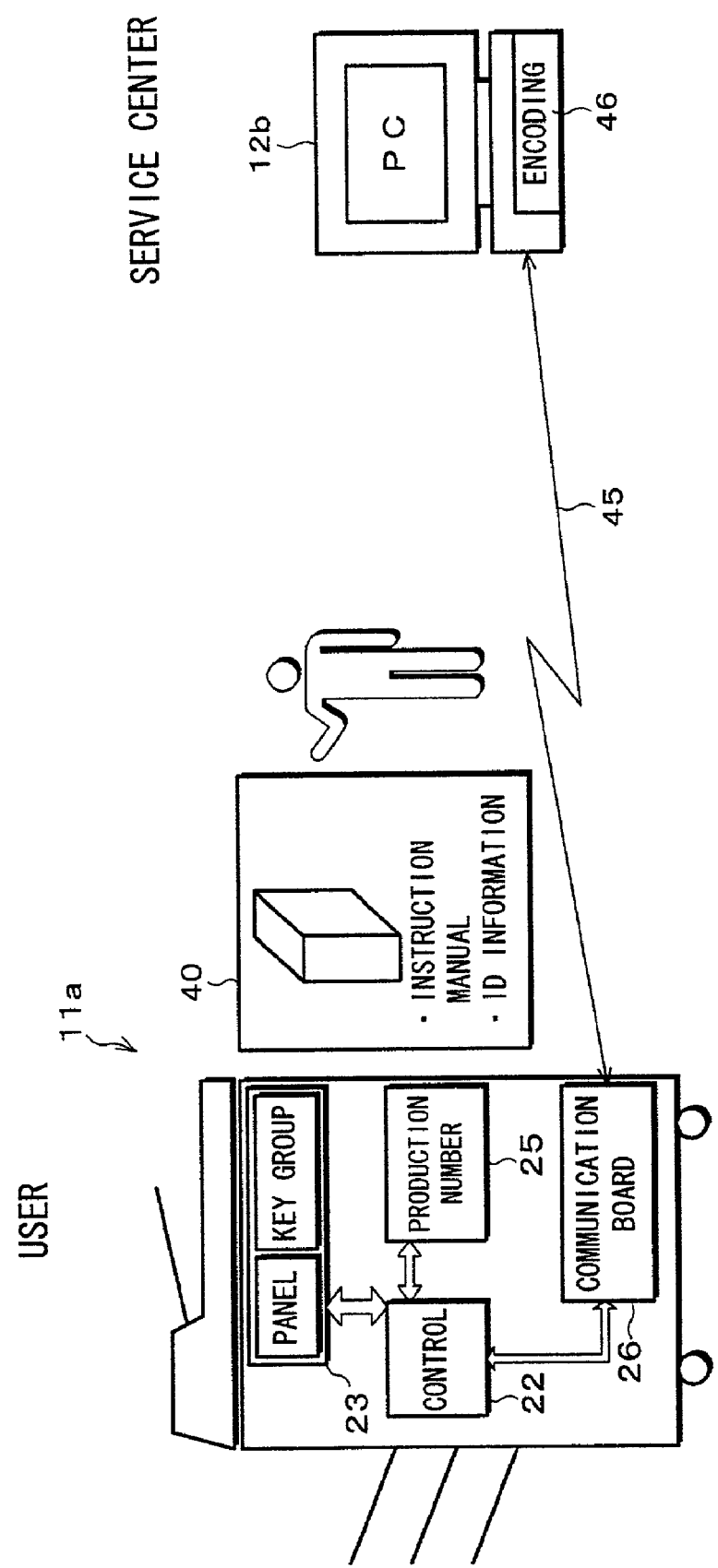
FIG. 7 is a view explaining a management system of an image processing device in accordance with a second embodiment of the present invention.
Figure 8:
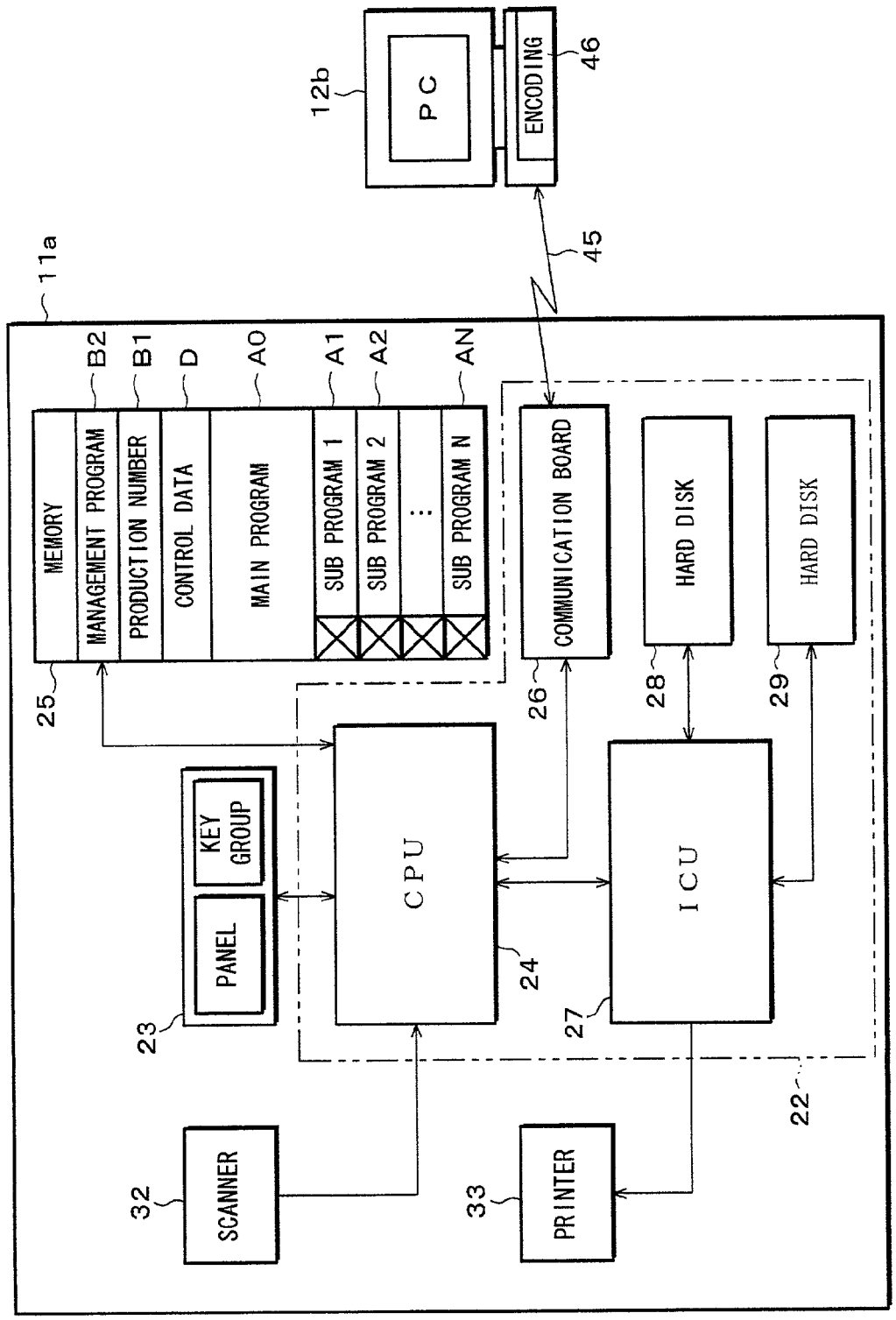
FIG. 8 is a block diagram illustrating an arrangement of control sections and control target sections associated with the control sections in the foregoing image processing device shown in FIG. 7.

FIG. 7 is a view for explaining a management system for an image processing device in accordance with the second embodiment of the present invention, and FIG. 8 is a block diagram illustrating an arrangement of a control section 22 of the image processing device 11a and a control target sections associated with the control section 22. The system shown in FIGS. 7 and 8 is similar to the system shown in FIGS. 1 and 2, and the members having the same structure (function) will be designated by the same reference numerals and their description will be omitted. What should be noted is that in the foregoing system the image processing device 11a and a managing device 12b are connected with each other via a wide-area network 45 such as a telephone line or Internet so that data such as states of expendables including paper and toner and a count of a copy counter should be transmitted to a service center, and the foregoing releasing key operation is carried out via the wide-area network 45.

In such a case, the foregoing production number is managed along with the state of expendables and the count of the copied sheets by the managing device 12b, what the user is required to do on the image processing device 11a is only to input a function desired to be added for extension, and the control section informs it to the managing device 12b by online sign-up or the like from the communication board 26 via the wire-area network 45. In response to this, in the managing device 12b, an encoding section 46 manages history information as shown in FIG. 5 while checks a state of registration to avoid double registration for instance, then produces a releasing key by encoding the production number transmitted thereto and sends the same to the image processing device 11a through the wire-area network 45 and the communication board 26. The control section 22 decodes the production number encoded from the releasing key that has received, according to the management program stored in the memory region B2 of the memory section 25, collates the same with the production number stored in the memory region B1, and makes the sub program P20 for additional functions accessible in the case where the decoded result matches the production number stored.

By arranging as above, the releasing key operation is automatically carried out, thereby rendering visit of a service man for the releasing key operation unnecessary. As a result, the sub program P20 can be promptly made ready for use at low costs. In this case as well, the managing device 12b of the seller and the managing device 12a of the manufacturer are connected with each other via the wide-area network 44 as shown in FIG. 9, like in FIG. 6, so that the releasing key should be issued from the manufacturer to the seller. In this case, the encoding section 46 is provided in the managing device 12a.

The following description will depict a third embodiment of the present invention while referring to the drawings.

FIG. 10 is a view illustrating a management system of an image processing device in accordance with the third embodiment of the present invention. The system shown in FIG. 10 is similar to the systems shown in FIGS. 1 and 7, and the members having the same structure (function) will be designated by the same reference numerals and their description will be omitted. What should be noted is that in the foregoing system a personal computer 47 of the user side and the managing device 12b are connected via the wide-area network 45, so that a releasing key issued automatically by the managing device 12b should be transmitted by electronic mail.

Therefore, even in the case where the image processing device 11 is not connected with the wide-area network 45, the user can access a home page provided by the managing device 12b at the service center by means of the user's personal computer 47 that is connected with the wide-area network 45, and has a releasing key automatically issued.

In this case, the releasing key may not be characters or numerals that can be input by keys as described above, but may be a bar code or a figure, so that the releasing key operation may be carried out by causing a printer connected with the personal computer 47 to print out the bar code or the figure and causing the image processing device 11 to read the same. This arrangement can further improve confidentiality of the releasing key.

In this case as well, the managing device 12b of the seller and the managing device 12a of the manufacturer are connected with each other via the wide-area network 44 as shown in FIG. 11, like in FIGS. 6 and 9, so that the releasing key should be issued from the manufacturer to the seller.

As described above, an image processing device (electronic apparatus) 11 in accordance with the present embodiments is characterized by including (i) a memory section 25 (program storing section) for storing a main program (first program) for controlling basic operations of the image processing device 11, and a sub program (second program) that is accessed in the main program so as to control an additional operation of the image processing device, (ii) a control section for implementing a desired operation by executing only the main program, or both the main and sub programs, and (iii) a system managing section that, in response to a releasing key operation that renders the additional operation implementable, makes the sub program accessible in the main program. Incidentally, in the arrangement of the present embodiment, the CPU 24 corresponds to the foregoing control section and the system managing section.

In a normal state of the foregoing device after shipment to the market, the system managing section inhibits access to the sub program, and the foregoing image processing device 11 operates according to the main program. When the releasing key is issued upon the user entering into a use contract with the manufacturer or the seller or paying a use fee thereto, the sub program is made accessible by a releasing key operation using the releasing key, whereby the sub program becomes implementable.

Therefore, it is possible to carry out expansion of function according to the user's purpose of use or an environment of use. Moreover, the expansion of functions in this manner does not need replacement of boards or memories. Therefore, the manufacturer does not have to prepare a variety of boards or memories in which one or a plurality of the sub programs are combined with the main program, while on the user side extension of functions does not result in making any part unnecessary. Therefore, the arrangement that allows extension of functions after shipment requires only a slightly larger memory capacity to be installed in the device, but results in reduction of costs for parts regarding the device as a whole. Furthermore, illegal use of copied boards and memories can be eliminated.

Furthermore, since only one program is stored in the memory section 25 and only inhibition of access to a part thereof is carried out, defects such as bugs decreases as compared with the case of later addition by replacement or installation, and sequence of the entirety possibly becomes smoother. Therefore, an operation checking work and the like can be simplified, while the reliability can be improved. Furthermore, the extension of function can be implemented, not by complicated works such as replacement of boards or installation that require expertise, but by simple setting operations that a service man or a user can carry out.

Thus, extension of functions after shipment can be smoothly carried out at lower costs.

Furthermore, to achieve the aforementioned object, an image processing device 11 in accordance with the present embodiments includes (i) a memory section 25 for storing a main program for controlling basic operations of the image processing device 11, and a sub program that cooperates with at least a part of the main program so as to implement an additional operation of the image processing device, and (ii) a system managing section that, in response to a releasing key operation that renders the additional operation implementable, makes the sub program accessible.

In a normal state of the foregoing device after shipment to the market, the system managing section inhibits access to the sub program, and only basic operations according to the main program are implemented. When the releasing key is issued upon the user entering into a use contract with the manufacturer or the seller or paying a use fee thereto, the sub program is made accessible by a releasing key operation using the releasing key, whereby additional operations can be implemented by cooperative operations of the main and sub programs.

Thus, in this case as well, extension of functions after shipment can be smoothly carried out at lower costs.

Furthermore, the image processing device in accordance with the present embodiments is further characterized in that the releasing key is produced using at least information peculiar to the device.

With the foregoing arrangement, a releasing key produced by using information peculiar to a device such as a production number varies from one device to another. Therefore, even if the releasing key that a user obtains by paying a use fee or the like is used with respect to a plurality of devices, access to sub programs remains inhibited in devices whose peculiar information is different from that for the releasing key. In other words, illegal use of a releasing key can be inhibited.

Furthermore, the image processing device 11 in accordance with the present embodiments is characterized in that the image processing device 11 is connected with a managing side via a wide-area network, and the releasing key operation is carried out by the managing side by remote control.

With the foregoing arrangement, in response to the user entering into a use contract or paying a use fee, the releasing key is issued by the managing side such as a manufacturer or a seller, and is set in the system managing section via the wide-area network such as Internet. Thus, the releasing key operation is automatically carried out.

Therefore, this makes it unnecessary for a service man to bother to visit to carry out the releasing key operation, and makes the sub program implementable smoothly at lower costs.

Furthermore, the image processing device 11 in accordance with the present embodiments is characterized in that (i) the memory section 25 stores a plurality of sub programs, and (ii) with respect to a certain combination of the sub programs, the system managing section renders the sub programs implementable by only one releasing-key operation.

According to the foregoing arrangement, in the case where a plurality of sub programs for additional functions are sold in combination, the releasing key operation is not carried out for each sub program, but different functions are prepared for respective combinations of sub programs, whereby only one releasing-key operation is carried out to make accessible all the plurality of sub programs for additional functions in one combination. Thus, the releasing key operation can be simplified.

Furthermore, a management system in accordance with the present embodiments for managing an image processing device 11, the image processing device 11 including:

- a memory section 25 for storing a main program for controlling basic operations of the image processing device 11, and a sub program that is accessible in the main program and controls an additional operation of the image processing device 11;
- a control section for implementing a desired operation by executing only the main program, or both the main and sub programs; and
- a system managing section that, in response to a releasing key operation, makes the sub program accessible by the main program, the management system is characterized by including a key issuing section on a managing side that issues the releasing key upon confirming that a predetermined procedure has been conducted by a user side.

With the foregoing arrangement, extension of functions can be carried out without replacement of any parts after shipment of the device to the market, while the managing side has an advantage that extension of functions in such a manner does not cause any additional costs on the managing side while produces profits even after sales of the device, in addition to profits from sales of expendables.

Furthermore, a management system in accordance with the present embodiments for managing an image processing device 11, the image processing device 11 including:

- a memory section 25 for storing a main program for controlling basic operations of the image processing device 11, and a sub program that cooperates with at least a part of the main program so as to implement an additional operation of the image processing device 11; and
- a system managing section that, in response to a releasing key operation, makes the sub program accessible, the image processing device 11 is characterized by including a key issuing section on a managing side that issues the releasing key upon confirming that a predetermined procedure has been conducted by a user side.

With the foregoing image processing device 11 as well, extension of functions can be carried out without replacement of any parts after shipment of the device to the market, while the managing side has an advantage that extension of functions in such a manner does not cause any additional costs on the service center side while produces profits even after sales of the device, in addition to profits from sales of expendables.

Furthermore, the management system in accordance with the present embodiments for managing an image processing device 11 is characterized in that the releasing key is produced using at least information peculiar to the device.

With the foregoing arrangement, the releasing key varies from one device to another. Therefore, even if the releasing key that a user obtains by entering into a use contract or paying a use fee is used with respect to a plurality of devices, access to sub programs remains inhibited in devices whose production numbers are different from that for the releasing key. In other words, illegal use of a releasing key can be inhibited, while management of the image processing device 11 after sales can be strictly carried out by the management side.

Furthermore, the management system in accordance with the present embodiments for managing an image processing device 11 is characterized in that the image processing device 11 is connected with a managing side via a wide-area network, and the key issuing section carries out the releasing key operation of the system managing section by remote control.

With the foregoing arrangement, in response to the user entering into a use contract or paying a use fee, the releasing key is issued by the managing side such as a manufacturer or a seller, and is set in the system managing section via the wide-area network such as Internet. Thus, the releasing key operation is automatically carried out.

Therefore, this makes it unnecessary for a service man to bother to visit to carry out the releasing key operation, and makes the sub program implementable smoothly at lower costs.

Furthermore, the management system in accordance with the present embodiments for managing an image processing device 11 is characterized in that on the managing side, the key issuing section issues the releasing key in response to entrance into a use contract or payment of a use fee.

Furthermore, the management system in accordance with the present embodiments for managing an image processing device 11 is characterized in that history information relating to the issuance of a releasing key is managed by the managing side.

This allows the managing side to promptly grasp the state of use of additional functions, and to utilize the information for planning novel articles, for instance, for development of systems.

Furthermore, the management system in accordance with the present embodiments for managing an image processing device 11 is characterized in that (i) the memory section 25 stores a plurality of sub programs, and (ii) with respect to a certain combination of the sub programs, the system managing section renders the sub programs implementable by only one releasing-key operation.

According to the foregoing arrangement, in the case where a plurality of sub programs for additional functions are sold in combination, the releasing key operation is not carried out for each sub program, but different functions are prepared for respective combinations of sub programs, whereby only one releasing-key operation is carried out to make accessible all the plurality of sub programs for additional functions in one combination. Thus, the releasing key operation can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device including a plurality of elements, the image processing device comprising:
   a program storing section storing a first program that controls basic operations of said image processing device so that basic operations of the image processing device are executed by controlling elements of the image processing device via the first program, and a second program that is a subroutine and is accessed in said first program so as to control an additional operation of said image processing device so that the second program controls the additional operation that is different than the basic operations controlled by the first program, wherein the second program is available via elements of the image processing device that executes the basic operations via the first program;

a control section implementing an operation by executing only said first program, or both said first and second programs;

a system managing section that, in response to a releasing key operation that renders the additional operation implementable, makes said second program permanently accessible in said first program, and wherein said first program is accessible and operable both before and after the releasing key operation so that one releasing key operation makes the second program permanently accessible following said one releasing key operation, and wherein the second program is a subroutine of the first program; and wherein the image processing device is an image forming apparatus, a combination of the image forming apparatus and a peripheral device realizes an image forming system, wherein the first program is a program that controls the image forming apparatus and the second program is a program that controls the peripheral device that works with the image forming apparatus.

2. The image processing device as set forth in claim 1, wherein said releasing key is produced using at least information peculiar to said apparatus.

3. The image processing device as set forth in claim 1, wherein:
said image processing device is connected with a managing side via a wide-area network; and
the releasing key operation is carried out by the managing side by remote control.

4. The image processing device as set forth in claim 1, wherein:
said program storing section stores a plurality of second programs; and
with respect to a certain combination of said second programs, said system managing section renders said second programs implementable by only one releasing-key operation.

5. The image processing device of claim 1, wherein the second program includes an additional function pack allowing the an extension of functions of the image processing device to be implemented after shipment of the image processing device.

6. An image processing device comprising:
a program storing section for storing a first program that controls basic operations of said image processing device so that basic operations of the image processing device are executed by controlling elements of the apparatus via the first program, and a second program that cooperates with at least a part of said first program so as to implement an additional operation of said image processing device, wherein the second program is a subroutine of the first program wherein the second program controls at least one additional operation that is different than the basic operations controlled by the first program, wherein the second program is available via elements of the image processing device that executes the basic operations via the first program;
a system managing section that, in response to a releasing key operation that renders the additional operation implementable, makes said second program permanently accessible, the first program being accessible prior to the releasing key operation;
wherein said releasing key operation determines whether the release key information matches release key information stored in memory and if so then making the second program permanently accessible so that one releasing key operation makes the second program permanently accessible following said one releasing key; and
wherein the image processing device is an image forming apparatus, a combination of the image forming apparatus and a peripheral device realizes an image forming system, wherein the first program is a program that controls the image forming apparatus and the second program is a program that controls the peripheral device that works with the image forming apparatus.

7. The image processing device as set forth in claim 6, wherein said releasing key is produced using at least information peculiar to said apparatus.

8. The image processing device as set forth in claim 6, wherein:
said image processing device is connected with a managing side via a wide-area network; and
the releasing key operation is carried out by the managing side by remote control.

9. The image processing device as set forth in claim 6, wherein:
said program storing section stores a plurality of second programs; and
with respect to a certain combination of said second programs, said system managing section renders said second programs implementable by only one releasing-key operation.

10. The image processing device of claim 6, wherein said releasing key operation comprises, in response to a request by the image processing device, the image processing device receiving release key information from a service center remote from the image processing device and determining whether the release key information matches release key information stored in memory and if so then making the second program accessible.

11. The image processing device of claim 6, wherein the second program includes an additional function pack allowing the an extension of functions of the image processing device to be implemented after shipment of the image processing device.

12. A management system for managing an image processing device, said image processing device including:
a program storing section for storing a first program that controls basic operations of said image processing device so that basic operations of the image processing device are executed by controlling elements of the apparatus via the first program, and a second program that is accessible in said first program and controls an additional operation of said image processing device, wherein the second program is a subroutine of the first program wherein the second program controls at least one additional operation that is different than the basic operations controlled by the first program, wherein the second program is available via elements of the image processing device that executes the basic operations via the first program;
a control section for implementing an operation by executing only said first program, or both said first and second programs; and a system managing section that, in response to a releasing key operation, makes said second program permanently accessible by said first program, said management system comprising a key issuing section on a managing side, said key issuing section issuing said releasing key upon confirming that a predetermined procedure has been conducted by a user side so that one releasing key operation makes the second program permanently accessible following said one releasing key operation, and wherein said first program is accessible and operable both before and after the releasing key operation; and wherein the image processing device is an image forming apparatus, a combination of the image forming apparatus and a peripheral device realizes an image forming system, wherein the first program is a program that controls the image forming apparatus and the second program is a program that controls the peripheral device that works with the image forming apparatus.

13. The management system as set forth in claim 12, wherein said releasing key is produced using at least information peculiar to said apparatus.

14. The image processing device as set forth in claim 12, wherein:

said image processing device is connected with a managing side via a wide-area network; and said key issuing section carries out the releasing key operation of said system managing section by remote control.

15. The management system as set forth in claim 12, wherein, on said managing side, said key issuing section issues said releasing key in response to entrance into a use contract or payment of a use fee.

16. The management system as set forth in claim 12, wherein history information relating to said issuance of a releasing key is managed by said managing side.

17. The management system as set forth in claim 12, wherein:

said program storing section stores a plurality of second programs; and with respect to a certain combination of said second programs, said system managing section renders said second programs implementable by only one releasing-key operation.

18. The image processing device of claim 12, wherein the second program includes an additional function pack allowing the an extension of functions of the image processing device to be implemented after shipment of the image processing device.

19. A management system for managing an image processing device, said image processing device including:

a program storing section for storing a first program that controls basic operations of said image processing device so that basic operations of the image processing device are executed by controlling elements of the apparatus via the first program, and a second program that cooperates with at least a part of said first program so as to implement an additional operation of said image processing device, wherein the second program is a subroutine of the first program wherein the second program controls at least one additional operation that is different than the basic operations controlled by the first program, wherein the second program is available via elements of the image processing device that executes the basic operations via the first program; and a system managing section that, in response to a releasing key operation, makes said second program permanently accessible, so that one releasing key operation makes the second program permanently accessible following said one releasing key operation, said management system comprising a key issuing section on a managing side, said key issuing section issuing said releasing key upon confirming that a predetermined procedure has been conducted by a user side, and wherein said first program is accessible and operable both before and after the releasing key operation; and wherein the image processing device is an image forming apparatus, a combination of the image forming apparatus and a peripheral device realizes an image forming system, wherein the first program is a program that controls the image forming apparatus and the second program is a program that controls the peripheral device that works with the image forming apparatus.

20. The management system as set forth in claim 19, wherein said releasing key is produced using at least information peculiar to said image processing device.

21. The management system as set forth in claim 19, wherein:

said image processing device is connected with a managing side via a wide-area network; and said key issuing section carries out the releasing key operation of said system managing section by remote control.

22. The management system as set forth in claim 19, wherein, on said managing side, said key issuing section issues said releasing key in response to entrance into a use contract or payment of a use fee.

23. The management system as set forth in claim 19, wherein history information relating to said issuance of a releasing key is managed by said managing side.

24. The management system as set forth in claim 19, wherein:

said program storing section stores a plurality of second programs; and with respect to a certain combination of said second programs, said system managing section renders said second programs implementable by only one releasing-key operation.

25. The image processing device of claim 19, wherein the second program includes an additional function pack allowing the an extension of functions of the image processing device to be implemented after shipment of the image processing device.

* * * * *